Dec. 26, 1967     P. LOCKWOOD     3,360,107
ENDLESS BAND CONVEYORS

Filed June 7, 1966     2 Sheets-Sheet 1

Inventor
Peter Lockwood

By
Watson, Cole, Grindle & Watson
Attorneys

United States Patent Office 3,360,107
Patented Dec. 26, 1967

3,360,107
ENDLESS BAND CONVEYORS
Peter Lockwood, Acycliffe Industrial Estate, near Darlington, England, assignor, by mesne assignments, to Mining Progress Inc., Highland Mills, N.Y., a corporation of New York
Filed June 7, 1966, Ser. No. 555,761
Claims priority, application Great Britain, July 22, 1965, 31,163/65
2 Claims. (Cl. 198—203)

ABSTRACT OF THE DISCLOSURE

A drive head for a scraper chain conveyor which includes an integrally formed frame of a pair of side plates and a transverse vertical plate with an extension plate and the integral formation of the gearboxes serving to reinforce said frame. The gearboxes are provided with replaceable cover plates which can be used to support the driving motor and allow quick conversion of the drive head to suit necessary power requirements.

---

This invention relates to driving means for scraper chain conveyors. The object of the invention is to provide a drive head capable of being applied in unit form to the or each end of a length of scraper-chain conveyor troughing, and versatile as to the manner in which one or more driving motors may be applied to the complete conveyor.

According to the present invention, a drive head for a scraper-chain conveyor comprises side plates adapted to be secured to the ends of the sides of the troughing of the conveyor, the side plates being integrally connected by a transverse vertical plate parallel to the axis of a sprocket shaft journalled in the plates, and also being spanned by a plate to form an extension of the upper floor plate of the troughing, there being a gearbox formed integrally with and externally of each side plate to enable the sprocket shaft to be driven through reduction gearing in either or both of the gearboxes from a motor mounted on a replaceable cover plate of either or both of the gearboxes.

The self-contained drive head can be directly applied to an end of a scraper-chain conveyor troughing, particularly relatively short troughing to provide a complete conveyor installed in a mining machine, with either one gearbox fitted with reduction gearing to be driven by a motor fitted to the cover plate of that gearbox, or with both boxes fitted with gearing and motors where the power requirements are high. The drive head may be fitted to one end only of the conveyor, the other end being fitted with a head containing an idle sprocket shaft, or drive heads may be fitted to both ends of the conveyor, with one or two motors to each, as may be desired.

When only one motor is fitted to the drive head, only the cover plate of the one gearbox containing the necessary reduction gearing need be provided with bearing housings for the gearing and for the output shaft of the motor; the cover plate of the other gearbox (which contains no gearing) can be quite plain.

For ready and accurate attachment of the drive head to the conveyor troughing, the side plates may be provided with slots to receive the ends of the sides of the troughing, with pinch screws to grip the sides of the troughing. Preferably, each side plate has two dowel holes to register with similar holes in the sides of the troughing, and to receive locating dowel pins.

The unit constituting the drive head can be made very rigid, and can be accurately and firmly aligned with the troughing in the manner described above. The sprocket shaft can therefore be precisely located transversely of the conveyor, even though the drive head is interchangeable on different lengths of troughing. Moreover, the transverse vertical plate by which the side plates are integrally connected can carry scrapers accurately located between the sides of each sprocket wheel on the shaft, for freeing of the wheels of debris.

For the replaceable fitting of a drive motor, e.g., a hydraulic motor, the replaceable cover provided with bearing housings for the gear trains need only have bolt holes to register with holes in a flange of the motor, the output shaft of which is then located in driving connection with the input gear of the gearbox.

The invention will now be described in greater detail by way of example, with reference to the accompanying drawings in which.

Figure 1:
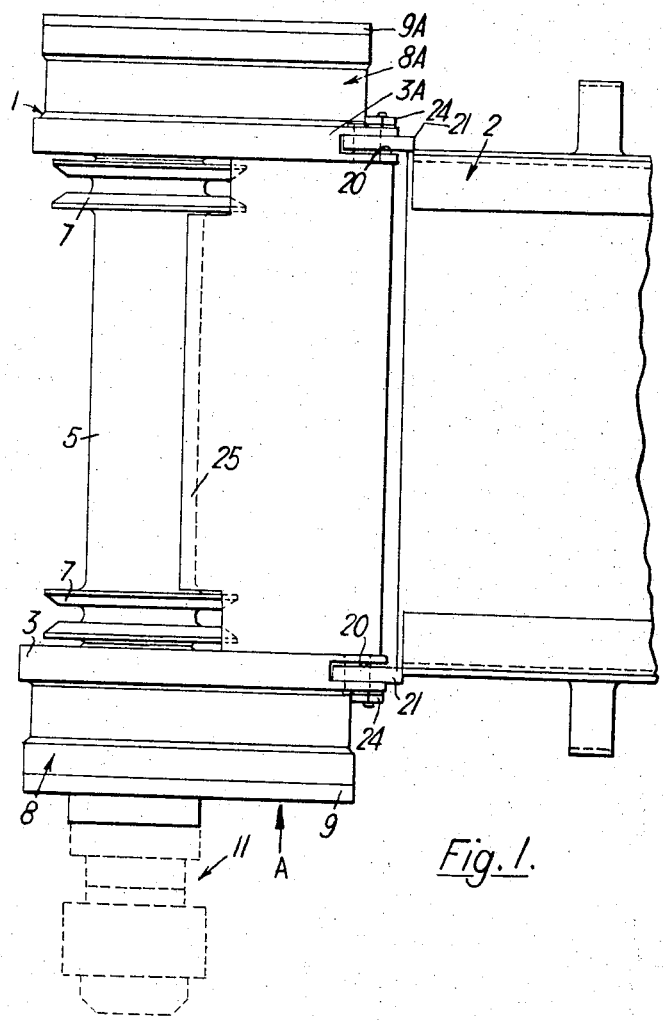
FIGURE 1 is a diagrammatic plan view of a drive head attached to a conveyor, and provided with a single drive motor.
Figure 2:
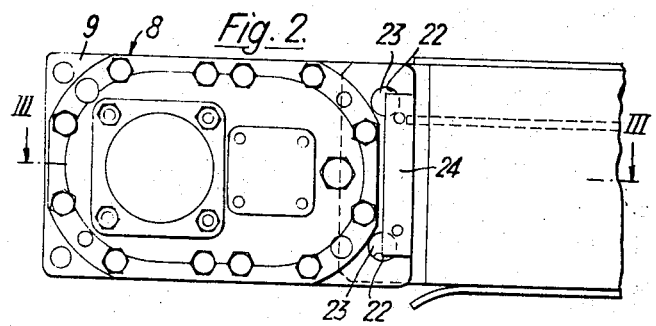
FIGURE 2 is a view in direction A of FIGURE 1 with the drive motor removed.

In the drawings, the drive head 1, suitable for a scraper chain conveyor, is secured to a conveyor section 2 with the usual driving chain, and conveyor proper removed for the sake of clarity.

The drive head includes two side plates 3, 3A integrally connected by a transverse vertical plate 4 parallel to the axis of a sprocket shaft 5 journalled on a bearing 6 in each side plate 3, 3A, and carrying the usual pair of sprocket wheels 7.

Gearboxes 8, 8A are formed integrally with and externally of each side plate 3, 3A and provided with cover plates 9, 9A. The gearbox 8 contains reduction gearing 10 and the cover plate 9 has bolt holes to register with holes (not shown) in a flange of a drive motor 11 shown in chain-dotted line in FIGURE 1, to enable the motor to be mounted on the cover plate 9. With the motor so mounted, its output shaft (not shown) is in driving connection with the input pinion 12 of the gearbox which is journalled in bearings 13, 13A. The pinion 12 meshes with a gearwheel 14 mounted on one end of a shaft 15 journalled in bearings 16, 16A in the side plate and cover plate respectively. On the other end of the shaft 15 is a pinion 17 meshing with a gearwheel 18 supported in the bearings 6, and secured to the sprocket shaft 5. In the situation shown in the drawing, with a single drive motor providing sufficient power, the gearbox 8A contains no gearing and the cover plate 9A is quite plain.

Figure 3:
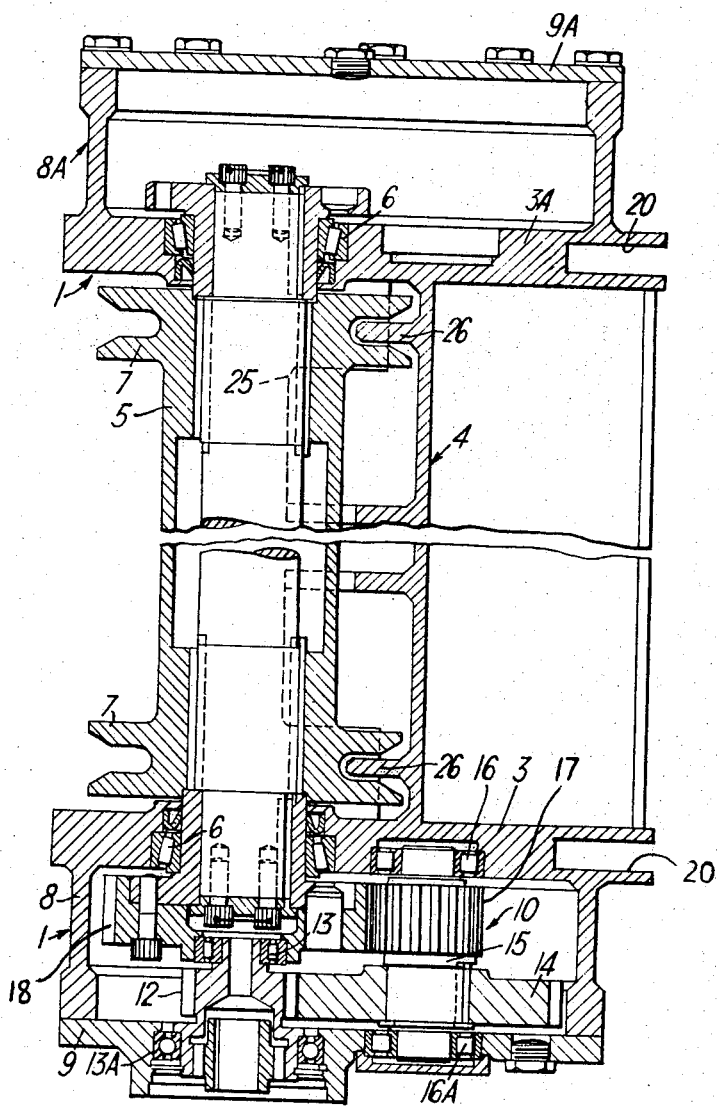
FIGURE 3 is a section on the line III—III of FIGURE 2.

The side plates 3, 3A are each provided with slots 20 to receive the ends 21 of the sides of the troughing of the conveyor section 2, as can be seen in FIGURES 1 and 3. Each side plate has two dowel holes 22 to register with similar holes in the sides of the ends of the sides of the troughing and to receive locating dowel pins 23 which are retained in position by a keep plate 24 screwed to each side plate.

The side plates 3, 3A are also spanned by a plate 25 (FIGURES 1 and 3) forming an extension of the upper floor plate of the troughing.

The transverse vertical plate 4 carries scrapers 26 located between the sides of each sprocket wheel 7 on the sprocket shaft 5 to ensure the sprocket wheels 7 are maintained free of debris.

Thus the drive head can be accurately attached to the conveyor troughing by simple alignment of the slots 20 with the ends of the side of the troughing and one or two drive motors fitted to the drive head, depending upon the specific power requirements of a particular job. It is also possible to fit a similar drive head to the other end of a conveyor run, again with one or two drive motors depending upon power requirements.

What I claim is:
1. A drive head for a scraper chain conveyor of the type that operates in a trough, said drive head being adapted for quick conversion to suit necessary power requirements comprising two side plates, a transverse vertical plate integrally connecting the side plates to form an integral rigid frame therewith, a drive shaft extending parallel to said frame and journalled for rotation in the side plates, a pair of sprocket wheels mounted on said drive shaft between and respectively adjacent to said side plates for receiving said chain conveyor, a horizontal plate spanning said frame and mounted by said side plates so as to form an extension of said trough and reinforce said frame, a gearbox formed integrally with and on the outside of each side plate so as to further reinforce said frame, a reduction gearing unit being mounted in at least one gearbox and drivingly connected to said drive shaft, a motor for driving said shaft through said reduction gearing unit, and a replaceable cover plate for enclosing each gearbox for easy removal and replacement of said reduction gearing unit in accordance with said power requirements.

2. A drive head as in claim 1 wherein said drive motor is carried by the replaceable cover plate of the respective gearbox for easy removal and replacement.

References Cited

UNITED STATES PATENTS

| | | | |
|---|---|---|---|
| 2,227,776 | 1/1941 | Anderson | 198—229 |
| 2,493,333 | 1/1950 | Baehr | 198—203 |
| 2,965,217 | 12/1960 | Dommann | 198—203 |

FOREIGN PATENTS 1,015,370 12/1965 Great Britain.

RICHARD E. AEGERTER, *Primary Examiner.*